United States Patent [19]

Sexton, Jr. et al.

[11] 3,793,553

[45] Feb. 19, 1974

[54] LINEARITY CORRECTION CIRCUIT USING NEGATIVE FEEDBACK

[75] Inventors: Charles W. Sexton, Jr., Virginia Beach; John D. Jordan, Chesapeake, both of Va.

[73] Assignee: General Electric Company, Portsmouth, Va.

[22] Filed: Aug. 31, 1971

[21] Appl. No.: 176,590

[52] U.S. Cl. .......................... 315/27 TD, 315/27 R

[51] Int. Cl. .......................... H01j 29/70

[58] Field of Search .......... 315/27 TD, 27 LC, 27 R

[56] References Cited

UNITED STATES PATENTS

| | | | |
|---|---|---|---|
| 3,492,527 | 1/1970 | Griffey | 315/27 TD |
| 2,913,625 | 11/1959 | Finkelstein | 315/27 |
| 3,185,887 | 5/1965 | Kobbe | 315/27 X |
| 3,302,040 | 1/1967 | Dryden | 315/27 X |
| 3,426,243 | 2/1969 | Smeulers et al. | 315/27 |
| 3,488,554 | 1/1970 | Voige | 315/27 X |
| 3,629,497 | 12/1971 | Soardi et al. | 315/27 X |

*Primary Examiner*—Leland A. Sebastian
*Assistant Examiner*—P. A. Nelson

[57] ABSTRACT

A circuit for lessening the initial rate of change of a sweep signal in a deflection system. In a first embodiment, negative feedback from an intermediate stage is utilized in order to slow the rate at which the sweep signal increases. In another embodiment, voltage from an output stage is fed back to effectively expand the time constant of a sweep capacitor.

5 Claims, 2 Drawing Figures

LINEARITY CORRECTION CIRCUIT USING NEGATIVE FEEDBACK

BACKGROUND OF THE INVENTION

The present invention relates to cathode ray tube deflection circuits and, more particularly, to means for providing predetermined non-linear characteristics in sweep signals outputted thereby.

In the production of an image upon the face or screen of a cathode ray tube such as that used in a television receiver, a modulated electron beam is periodically scanned or deflected across the face of the tube. While this may be accomplished by either electrostatic or electromagnetic means, electromagnetic means are commonly utilized in commercial television receivers. Generally speaking, the characteristics of the magnetic field used for deflecting the electron beam are determined by current flowing through a deflection winding. Theoretically, a perfectly linear signal when applied to the winding should produce a linear sweep. However, due to inherent non-linear characteristics of portions of the deflection system, including the deflection transformer, current often varies substantially from the desired linear characteristic. It has been found necessary to compensate for this aberration by introducing corrections, or non-linearities, into the controlling or sweep signal.

One type of non-linearity which is commonly introduced is a lessening of the initial portion of the voltage rise across a sweep capacitor. Various means have been devised to mitigate or lessen the initial charging rate of the capacitor, thus lessening the initial voltage rise thereacross. In one commonly-used approach, a second capacitor is coupled in series with sweep capacitor, and a signal is fed back from an output stage to the junction between the two capacitors. Upon retrace, the sweep capacitor is almost entirely discharged, but a residual potential remains upon the second, modifying capacitor. This residual voltage serves to mitigate or offset the initial charging voltage applied to the sweep capacitor. Further, the voltage applied to the capacitor is commonly derived from a final stage of the drive circuit, after substantial amplification has taken place. Since voltage levels are substantially higher in the output stage than in previous, intermediate stages small errors or deviations therein can produce substantial changes in feedback level. Because of this the non-linearity introduced by such systems is often erratic, eventuating in "jitter," a phenomenon caused by erratic vertical deflection which makes a displayed image oscillate rapidly in a vertical sense. It will thus be appreciated that it would be highly desirable to provide means for lessening the initial charging rate of a sweep capacitor, without relying upon voltage levels which tend to vary and produce jitter.

It is therefore an object of the present invention to provide an improved vertical deflection circuit.

It is another object of this invention to provide vertical deflection circuitry which is less susceptible to jitter than previously-known deflection circuits.

It is still another object of the present invention to provide improved vertical deflection circuitry utilizing negative feedback for controlling the initial buildup of voltage across a sweep capacitor.

SUMMARY OF THE INVENTION

Briefly stated, in accordance with one aspect of the invention, the foregoing objects are achieved by applying capacitive feedback from an output terminal of a controlled electron discharge device to a source of control voltage, such as a sweep capacitor. The sweep capacitor provides a varying voltage to the control terminal of the electron discharge device, so that the feedback is applied to both the sweep capacitor and the control terminal. As current begins to flow through the electron discharge device, declining voltage occurring at one terminal thereof is fed back to mitigate or retard the rate at which the control terminal is forward-biased. After an initial portion of the trace period has elapsed, conduction of the electron discharge device is accelerated by the action of a non-linear charging circuit which produces an increased voltage rise across the sweep capacitor.

In a further embodiment, negative feedback is taken from a damping circuit coupled to the output stage of the deflection drive circuit. A decaying voltage from an R-C circuit, appearing as a negative-going signal, is fed back to the sweep capacitor for slowing the rate of charge of the capacitor. By utilizing an R-C circuit with a short time constant a feedback signal is produced which affects only the initial portion of the voltage rise across the capacitor.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiments taken in conjunction with the accompanying drawing in which:

DESCRIPTION OF THE PREFERRED EMBODIMENTS

Figure 1:
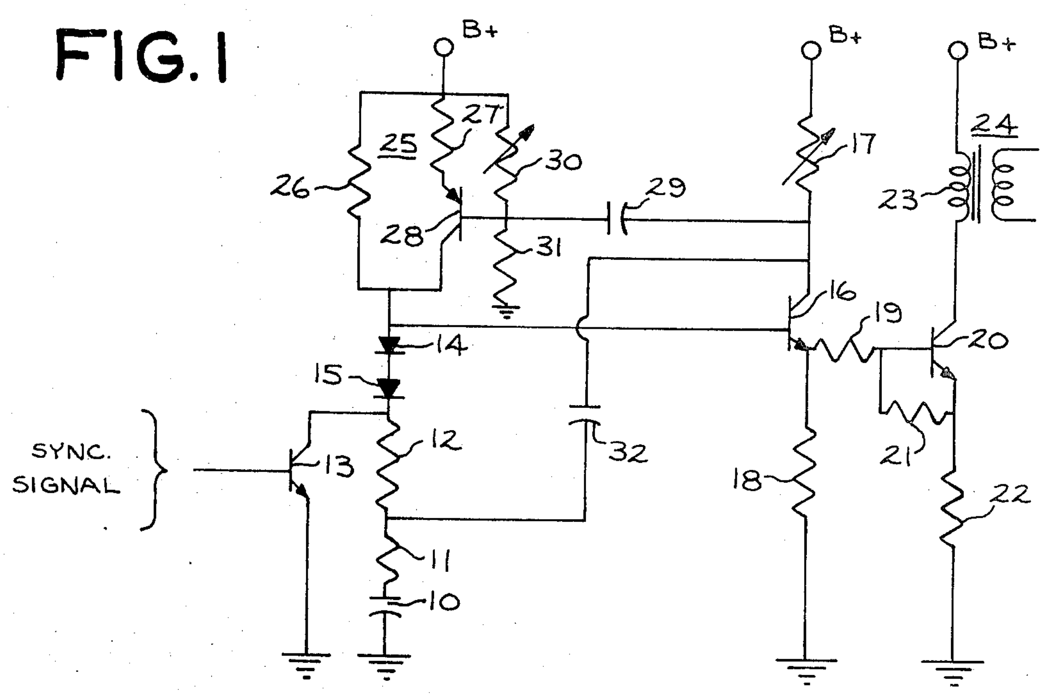
FIG. 1 is a schematic drawing of a vertical sweep drive circuit embodying principles of the present invention.

FIG. 1 shows one embodiment of the present invention, including a sweep capacitor 10 coupled in series with a pair of resistors 11 and 12. A switching transistor 13 is coupled in parallel with the series combination of the resistors and sweep capacitor. Switching transistor 13 receives sync pulses abstracted from a video signal for periodically discharging sweep capacitor 10. A pair of diodes 14 and 15 are coupled in series with the above-described circuit and provide a constant voltage drip thereacross despite variations in the charging currents flowing to sweep capacitor 10. This constant voltage drop constitutes an offset voltage which is applied to the base terminal of a drive transistor 16, along with the variable voltage appearing across sweep capacitor 10. Current is supplied to drive transistor 16 from a suitable source of potential by way of resistor 17. The emitter of drive transistor 16 is coupled to a point of common potential, here shown as ground, by another resistor 18. A coupling resistor 19 connects the emitter terminal of drive transistor 16 to the base terminal of an output transistor 20. A biasing resistor 21 is coupled between the base and emitter terminals of output transistor 20, and an emitter resistor 22 connects the emitter terminal of output transistor 20 to ground.

Output transistor 20 is coupled in series with primary winding 23 of a vertical output transformer generally indicated at 24. Output transistor 20 thus serves to control current flowing through transformer 24 in response to the state of conduction of driver transistor 16.

A non-linear charging circuit arrangement, generally indicated at 25, is provided for producing a generally parabolic voltage rise across sweep capacitor 10. Charging circuit 25 forms the subject matter of copending U.S. Patent application Ser. No. 176,470—John D. Jordan, and is assigned to the assignee of the present invention. As discussed in the aforementioned application, a first charging circuit including a resistor 26 supplies current to sweep capacitor 10 in a substantially linear fashion. A second charging circuit, including resistor 27 and transistor 28, superimposes a second charging current upon that supplied through resistor 26. The conductivity of transistor 28 is modulated by feedback voltage transmitted by capacitor 29 from the collector terminal of drive transistor 16, and thus increases as driver transistor 16 becomes more conductive. The net effect is to accelerate the rate of charging sweep capacitor 10 producing a substantially parabolic voltage characteristic thereacross. Biasing resistors 30 and 31 serve to apply a suitable average biasing potential to the base terminal of transistor 28.

It has been found that merely increasing the rate of voltage rise across sweep capacitor 10 during the final portion of the trace period is insufficient to provide the waveform desired. It has been determined that it is also necessary to mitigate or lessen the voltage rise upon the sweep capacitor during the initial portion of the period. To this end, feedback capacitor 32 is coupled from the collector terminal of driver transistor 16 to the intersection of resistors 11 and 12. Capacitor 32 thus serves to apply negative feedback to the charging circuit for modifying the operation of drive transistor 16.

In operation, at the beginning of a trace period current flows through resistor 26, diodes 14 and 15 and resistors 12 and 11 and begins to charge sweep capacitor 10 at a substantially linear rate. As the voltage appearing across sweep capacitor 10, resistors 11 and 12 and diodes 14 and 15 rises transistor 16 becomes more conductive. As transistor 16 conducts harder, the voltage appearing at the collector terminal thereof decreases due to the increasing voltage drop arising across resistor 17. The negative-going voltage thus produced is transmitted by means of feedback capacitor 32 to the intersection of resistors 11 and 12. The negative-going voltage is thus coupled to both sweep capacitor 10, and to the base terminal of drive transistor 16. The negative feedback opposes a voltage increase upon sweep capacitor 10 and so slows the rate at which drive transistor 16 becomes conductive, effectively mitigating the initial increase in current flow through the drive transistor. This slowed or retarded rate of current increase is reflected in a similarly retarded rate of current rise through output transistor 20. The desired non-linearity is thus introduced into the current flowing through the primary winding or vertical deflection transformer 24, eventuating in proper deflection of the electron beam.

As drive transistor 16 becomes still more conductive, the negative-going voltage signal appearing at its collector terminal is fed back through feedback capacitor 29 to transistor 28, driving transistor 28 into conduction and substantially increasing the current flowing to sweep capacitor 10. The regenerative feedback effect thus afforded is superimposed upon the degenerative feedback obtained through capacitor 32 and accelerates the rate of charge of sweep capacitor 10. The latter portion of the trace period is thus dominated by the activity of charging circuit 25. Due to the increased flow of charging current a substantially parabolic voltage increase occurs across sweep capacitor 10, eventuating in the desired parabolic increase in current flowing through output transistor 20.

It will therefore be seen that the circuit of FIG. 1 provides substantial mitigation of the voltage rise across sweep capacitor 10 for the initial portion of a trace period, without hindering the accelerated rate of voltage rise desired during the latter portion of the trace. Further, it will be seen that, due to the almost complete discharge of feedback capacitor 32 between trace periods the circuit has little "memory" or residual charge, so that for each succeeding trace the initial voltage level upon sweep capacitor 10 is substantially independent of the voltage attained during the preceeding trace. By making the bias level of each trace independent of preceeding traces, the major cause of jitter, or vertical image oscillation, is avoided.

Figure 2:
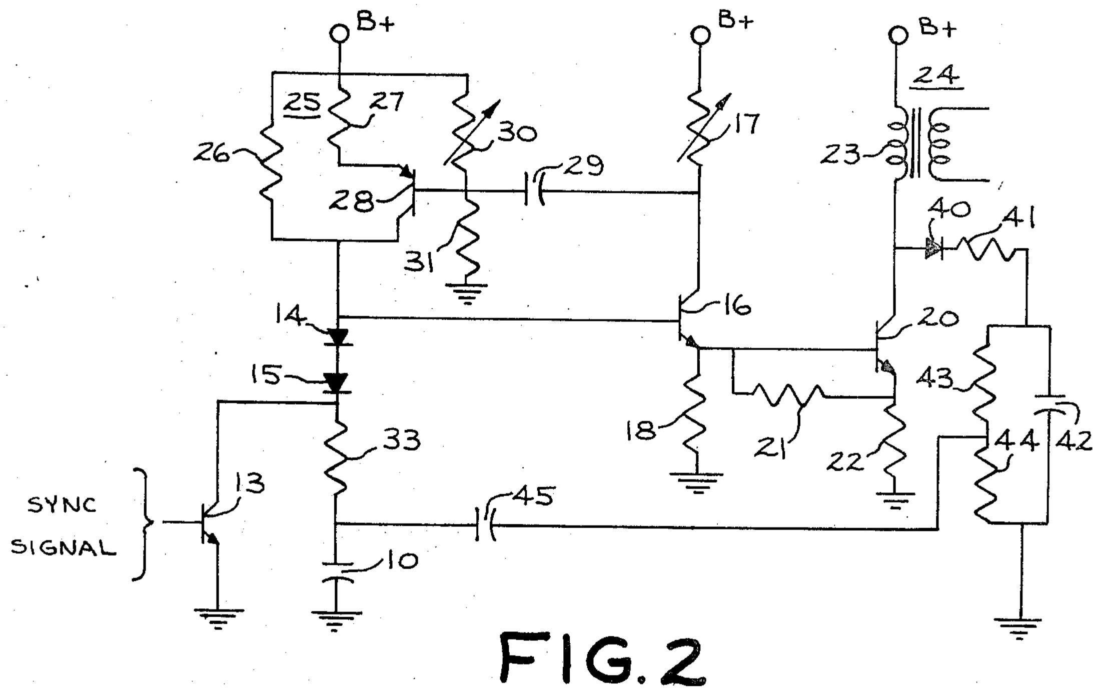
FIG. 2 is a schematic drawing of another vertical sweep system, utilizing a second embodiment of the invention.

Turning now to FIG. 2, there is shown a second embodiment of the present invention. To facilitate the description, elements which correspond to those shown in FIG. 1 are indicated by their original numbers.

As was discussed with respect to the circuit disclosed above, current is supplied by means of a charging circuit 25 in a manner which effects an increasing voltage upon a sweep capacitor 10 during the latter portion of a trace period. The increasing voltage thus effected is applied to the base terminal of a drive transistor 16, which in turn controls the operation of output transistor 20. As the current transmitted by transistor 16 increases the emitter terminal thereof becomes more positive, biasing output transistor 20 forwardly and effecting an increase in current through primary winding 23 of vertical output transformer 24. As will be understood by those skilled in the art, at the end of a trace period, when output transistor 20 suddenly ceases to conduct, the inductive reactance of primary winding 23 produces a spike of positive voltage at its lower end which impinges upon the collector terminal of output transistor 20. Such a sudden, high voltage pulse is often detrimental to a transistor and may have the effect of causing the transistor to continue to conduct, improperly prolonging the sweep period.

In order to nullify the undesirable effects of the positive voltage pulse, a damping network generally indicated at 39 is coupled in parallel with the output transistor. The network shown forms the subject matter of copending United States patent application Ser. No. 184,518, filed Sept. 28, 1971, invented by John D. Jordan and assigned to the assignee of the present invention. While the inventive circuit is shown in conjunction with a presently preferred embodiment of the present invention, it will be understood that other circuits may be substituted for the one illustrated. A diode 40 is connected between the damping network and the intersection of primary winding 23 and output transistor 20. The damping network 39 is comprised of a resistor 41 connected in series with the parallel combination of a capacitor 42 and series-connected resistors 43 and 44.

When a positive-going pulse arises at the collector terminal of output transistor 20, it forward biases diode 40 and flows into the damping circuit. The voltage pulse traverses resistor 41, and series-connected resistors 43 and 44. Simultaneously, capacitor 42 is charged to the voltage which appears across resistors 43, 44. When the positive pulse terminates, capacitor 42 begins to discharge through resistors 43 and 44, back-biasing diode 40.

The now-negative-going voltage drop across resistor 44 is fed back across capacitor 45 to the top of sweep capacitor 10. This has the effect of superimposing a declining voltage upon sweep capacitor 10 at the beginning of a trace period, when the sweep capacitor is receiving its initial charge.

A resistor 33 is placed between sweep capacitor 10 and offset diodes 14, 15 to limit the peak current in transistor 13 during the discharge of sweep capacitor 10, and to properly bias the base terminal of drive transistor 16. Some of the current flowing to charge sweep capacitor 10 is now drawn by feedback capacitor 45, thus in effect enlarging the apparent capacitance of the sweep capacitor and slowing the rate of voltage rise thereacross. After some period of time has elapsed, determined principally by the RC time constant of the damping network 39, the negative feedback supplied by capacitor 45 declines and the rate of voltage rise across sweep capacitor 10 increases.

From this point on, the voltage appearing across sweep capacitor 10 is determined by charging circuit 25, as explained above with respect to the embodiment of FIG. 1. The latter part of the trace period is again dominated by the activity of charging transistor 28, creating a parabolic increase in the voltage rise across the capacitor. A slight residual charge is maintained across capacitor 42 to back-bias diode 40 throughout the trace period, so that output transistor 20 alone controls the current flowing through transformer 24 during the trace period.

While it will be understood that the values of the various circuit components may be varied to suit a particular application, the following values of circuit components are given by way of example:

| | |
|---|---|
| Resistors | |
| 11 | 1.5 kilohms |
| 12 | 380 ohms |
| 17 | 1 kilohm |
| 18 | 2.2 " |
| 19 | 100 ohms |
| 21 | 220 " |
| 22 | 44 " |
| 26 | 250 kilohms |
| 27 | 10 " |
| 30 | 10 " |
| 31 | 100 " |
| 33 | 330 ohms |
| 41 | 820 " |
| 43 | 39 kilohms |
| 44 | 2.2 " |
| Capacitors | |
| 10 | .15 microfarads |
| 29 | 2 " |
| 32 | .15 " |
| 42 | .22 " |
| 45 | .047 " |
| Transistors | |
| 13 | Type 16 E (General Electric) |
| 16 | " " |
| 20 | MJE 340 (Motorola) |
| 28 | Type D 29 A (General Electric) |
| Diodes | |
| 14 | IN 914 |
| 15 | " |
| 40 | Type A 14 (General Electric) |

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. In a television receiver deflection system for providing periodically varying sweep signals to cathode ray tube beam deflection means, a shaping circuit for shaping said sweep signals, comprising a capacitor, means for charging said capacitor, means for periodically discharging said capacitor in response to sync signals developed within said television receiver such that periodically recurring sweep signals are developed across said capacitor, amplifying means responsive to said sweep signals to drive said beam deflection means, degenerative feedback means coupled between said amplifying means and said capacitor, said feedback means having a relatively short time constant so as to respond to initial changes in conduction of said amplifying means to slow the initial rate of charge of said capacitor thereby shaping the initial portion of said sweep signal.

2. A shaping circuit as recited in claim 1, wherein said amplifying means includes a damping circuit responsive to deflection retrace pulses during the discharge period of said capacitor, said feedback means being coupled to said damping circuit to apply a portion of said retrace voltage to said capacitor to impede initial charging of said capacitor.

3. A shaping circuit as recited in claim 1, wherein said amplifying means includes a driver transistor and an output transistor driven by said driver transistor, said driver transistor having a base input terminal and collector and emitter output terminals, said feedback means being connected to said collector output terminal, said capacitor being connected to said base input terminal such that said feedback means is coupled both to said base input terminal and to said capacitor to degeneratively control the effect the sweep signal has on said driver transistor.

4. In a television receiver deflection system for providing periodically varying sweep signals to cathode ray tube beam deflection means, a shaping circuit for shaping said sweep signals, comprising:

a capacitor, means for charging said capacitor, means for periodically discharging said capacitor in response to sync signals developed within said television receiver such that periodically recurring sweep signals are developed across said capacitor, amplifying means responsive to said sweep signals to drive said beam deflection means, first feedback means coupled between said amplifying means and said capacitor, second feedback means coupled between said amplifying means and said capacitor, said first feedback means responding to a voltage of said amplifying means of proper phase to provide a source of negative feedback for controlling the rate of charge of said capacitor, said second feedback means being coupled to said capacitor by said means for charging said capacitor to provide a source of positive feedback for controlling the rate of charge of said capacitor, each of said feedback means having a time constant, the time constant of said second feedback means being substantially longer than the time constant of said first feedback means so that said first feedback means responds to a voltage of said amplifying means to control the rate of charging of said capacitor during the initial period of charging and said second feedback means responds to a voltage of said amplifying means to control the rate of charging of said capacitor during substantially later periods of charging of said capacitor.

5. A shaping circuit as recited in claim 4, wherein said amplifying means includes a damping circuit responsive to deflection retrace pulses during the discharge period of said capacitor, said first feedback means being coupled to said damping circuit to apply a portion of said retrace voltage to said capacitor to impede initial charging of said capacitor.

* * * * *